United States Patent Office 3,149,112
Patented Sept. 15, 1964

3,149,112
PYRIDOPYRIMIDINONE COMPOUNDS
Robert E. Allen, Walnut Creek, Calif., assignor to Cutter Laboratories, Inc., Berkeley, Calif., a corporation of Delaware
No Drawing. Filed Sept. 6, 1961, Ser. No. 136,194
8 Claims. (Cl. 260—256.4)

This invention relates to compositions of matter classified in the art of chemistry as substituted 4H-pyrido[1,2-a]-pyrimidin-4-ones and to processes for making such compositions.

The invention sought to be patented, in its composition aspect, is described as residing in the concept of a chemical compound having a molecular structure in which there is attached to a 4H-pyrido[1,2-a]-pyrimidin-4-one nucleus, a secondary-amino radical through a lower-alkoxylene bridging radical to the ring carbon atom in the 2-position of the said nucleus.

The invention sought to be patented, in its process aspect, is described as residing in the concept of embodying such molecular structure in tangible form by the condensation of a 2-amino pyridine unsubstituted in the 6-position with a di-lower-alkyl malonic ester and alkylation of the resultant 4H-pyrido[1,2-a]-2-hydroxypyrimidin-4-one with a secondary-amino alkyl halide.

As used herein, the term "alkyl" means saturated monovalent aliphatic radicals of the general formula —$C_nH_{2n+1}$ and is inclusive of both straight-chain and branched-chain radicals wherein $n$ represents an integer up to 10.

As used herein, the term "lower-alkyl" means saturated monovalent aliphatic radicals of the general formula —$C_nH_{2n+1}$ wherein $n$ represents an integer less than 5 and is inclusive of both straight-chain and branched-chain radicals.

As used herein, the term "lower-alkoxylene" means saturated monovalent aliphatic radicals of the general formula —$OC_nH_{2n}$ wherein $n$ represents an integer less than 5 and is inclusive of both straight-chain and branched-chain radicals.

As used herein, the term "cycloalkyl" means saturated monovalent radicals of the cycloalkane series having from four to eight ring carbon atoms. The substitution of lower-alkyl, halo, lower-alkoxy, trifluoromethyl, and similar simple moieties on the cycloalkyl ring does not adversely affect the pharmacological activity of the compositions bearing such ring in the 3-position for their indicated purposes and such substituted compounds are the full equivalents of the compositions herein claimed.

As used herein, the term "phenyl" means the monovalent radical obtained when a hydrogen atom attached to a ring carbon atom of benzene is removed. The substitution of simple moieties on the phenyl ring, such as lower-alkyl, halo, lower-alkoxy, and trifluoromethyl, does not adversely affect the pharmacological activity of the compositions bearing the phenyl ring in the 3-position and such substituted compounds are the full equivalents of the compositions herein claimed.

As used herein, the term "phenalkyl radical" means a lower-alkyl radical as defined above bearing a phenyl substituent as defined above.

As used herein, the term "secondary-amino" means radicals wherein the attachment of a hydrogen to the unsatisfied valence of the radical would produce a secondary amine compound. The two substituents that create the secondary-amino configuration may be the same or different, or joined together through a carbon atom or a heterocyclic atom. For example, the substituents may be alkyl, cycloalkyl, or phenyl, as defined herein above; or joined together by a carbon atom to form a nitrogen heterocycle such as a pyrrolidine or a piperidine ring; or joined together via a heterocyclic atom such as oxygen to form a morpholine ring.

The physical embodiments of the subject matter sought to be patented can be identified by the following inherent physical properties: In their free base form they are high-boiling, oily liquids which possess the inherent applied use characteristic of exhibiting central nervous system stimulant activity as shown by standard testing procedures. The free bases are most conveniently used in the form of their crystalline, usually yellow, acid-addition salts, preferably as the hydrochlorides.

The manner and process of making and using the invention is illustrated by the following general description and examples, which set forth the best mode contemplated by me of carrying out the invention so as to enable any person skilled in the art of chemistry to make and use the same.

The free bases of this invention have been prepared by the O-alkylation of the corresponding 4H-pyrido[1,2-a]-2-hydroxypyrimidin-4-ones with secondary amino alkyl halide, such as a dilower-alkyl-amino, N-piperidino-, N-morpholino-, or N-pyrrolidino-lower-alkyl halide. This alkylation is effected in an unreactive solvent, such as alcohol or toluene, at the reflux temperature of the solvent. The alkylation is carried out either by conversion of the starting hydroxy compound to its alkali metal salt by reaction with an alkali metal alkoxide such as sodium ethoxide followed by addition of the appropriate lower-alkyl halide, or by the direct reaction of the reactant hydroxy compound and lower-alkyl halide in the presence of a molar equivalent of base.

The 4H-pyrido[1,2-a]-2-hydroxypyrimidin-4-ones are in turn prepared by the condensation of a 2-aminopyridine with a dilower-alkyl ester of malonic acid. The condensation is most conveniently effected by heating the reactants from 1 to 6 hours in the temperature range of 160 to 230 degrees centigrade. The reaction is usually continued until the distillation of the lower-alcohol corresponding to the alcohol portion of the malonic ester ceases. A high-boiling, indifferent solvent such as diphenyl ether may be employed. The reaction flask and condenser are so adapted that the alcohol is removed as formed while the higher boiling materials are returned to the reaction mixture.

The sequence of reactions is illustrated as follows:

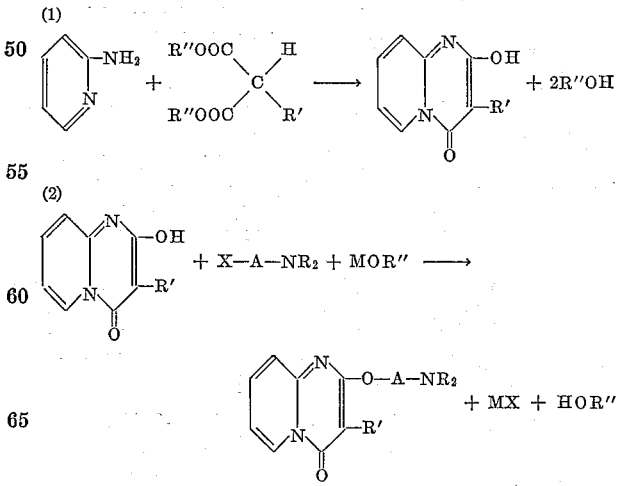

In the above formulae, R" represents a lower-alkyl radical, R' represents the hereinbelow described 3-position substituent, A represents a lower-alkylene radical having at least two carbon atoms, R represents a lower-alkyl radical or modified lower-alkyl radical as described below, X represents a halogen, and M represents an alkali metal.

The reactants in (1) above are a 2-aminopyridine and a malonic ester. The 2-aminopyridine may be unsubstituted or may be substituted by conventional groups, such as lower-alkyl, lower-alkoxy and halo, in any of the remaining ring positions except that ortho or adjacent to the heterocyclic nitrogen atom. Substitution of a group in that position on the pyridine ring will change the direction of ring closure and will not result in the formation of the desired product. It should also be noted that when halogen, but not lower-alkyl or lower-alkoxy, is substituted para to amino group of 2-aminopyridine, low yields of the desired pyridopyrimidinone are obtained. The reactant malonic ester can be substituted by R', the substituent that will appear in the 3-position of the intermediate 2-hydroxy-pyridopyrimidinone and ultimately in the aminoalkoxypyridopyrimidinone product. R' may be any organic radical capable of being bound via a carbon atom to the methylene carbon atom of a malonic ester. The substituted malonic esters most generally available can be classified as substituted by alkyl, cyclo-alkyl, phenyl and phenalkyl moieties containing up to and including 13 carbon atoms in the substituent as a whole. The aforementioned substituents may be unsubstituted radicals or those radicals may be further substituted by other conventional groups not adversely affecting the pharmacological properties of the corresponding unsubstituted entity.

The reactants in (2) above are the 2-hydroxypyridopyrimidone of (1), an amino lower-alkyl halide, and a base. The amino lower-alkyl halide is represented by X—A—NR$_2$ wherein A is a two, three or four carbon lower-alkylene radical and NR$_2$ is a dilower-alkyl-amino, a piperidino, a morpholino, or a pyrrolidino group; these values are determined by the nature of the product aminoalkoxypyridopyrimidinone to be prepared. The base, here represented as an alkali metal alcoholate MOR'', is present in at least stoichiometric amounts.

From the above discussion of the nature of the 2-aminopyridine reactant employed in (1), it is apparent that the intermediate hydroxypyridopyrimidinones and the product aminoalkoxypyridopyrimidinones may be substituted on the pyrido portion of the molecule by simple substituents such as halo, lower-alkyl, lower alkoxy, and the like. The presence of such substituents on the pyrido portion of the molecule does not interfere with the desirable pharmacological properties of the corresponding unsubstituted compounds and they are the full equivalents of such compounds and can be used for the same purposes.

The acid-addition salts of this invention can be prepared in a conventional manner by reacting the corresponding free bases of this invention with the usual inorganic acids, for examples, hydrochloric, hydrobromic, hydriodic, sulfuric and phosphoric; or an organic acid, for example, acetic, citric, and benzoic. The acid-addition salts of this invention are readily interconvertible into the free base form and are fully equivalent thereto; the conventional treatment of the acid-addition salt with an inorganic base regenerates the free base form. While the free bases of this invention have the same general pharmacological properties as their acid-addition salts, they are more often utilized in the preparation of such salts rather than directly for their pharmaceutical effects.

The foregoing discussion is offered to illustrate methods suitable for the practice of my invention and not to limit its scope. My invention is further illustrated by the following preparations and examples:

PREPARATIONS 1 TO 8.—2-HYDROXY-3-ALKYL-4H-PYRIDO[1,2-a]-PYRIMIDIN-4-ONES

The 2-hydroxy-3-alkyl-4H-pyrido[1,2-a]-pyrimidin-4-ones were prepared by the following generalized procedure: Roughly equivalent quantities of 2-aminopyridine and the appropriately alkyl substituted diethyl malonate were heated at above 190 degrees centigrade for several hours collecting the ethyl alcohol which distilled. Then after being cooled to room temperature, the yellow product was washed free of the reactants with ether and analyzed. Further heating of the residues obtained from evaporation of the wash ether gave additional product. The experimental details and the results obtained are tabulated below:

*Experimental Details*

| Preparation number | Alkyl group | Weight of 2-aminopyridine | Weight of alkyl diethyl malonate | Reaction temperature | Reaction time | Volume of alcohol |
|---|---|---|---|---|---|---|
| 1 | Methyl | 47 | 102 | 200–230 | 2½ | 47 |
| 2 | do | *54 | 87 | 200–220 | 3 | 40 |
| 3 | Ethyl | 47 | 98 | Ca. 200 | 5 | 32 |
| 4 | Propyl | 66 | 147 | 200–210 | 7 | |
| 5 | Isobutyl | 21 | 48 | Ca. 190 | 3 | |
| 6 | Hexyl | 30 | 80 | 200–220 | 9 | 16 |
| 7 | Octyl | 34 | 101 | 190–210 | 8 | 34 |
| 8 | Decyl | 34 | 110 | 205–210 | 8 | 28 |

*In preparation 2, 5-methyl-2, aminopyridine was the reactant.

NOTE.—All weights are in grams, volumes in milliliters, temperatures in degrees centigrade, and time in hours.

*Results*

| Preparation number | Weight of product | Melting point | Analysis: Found | | | Analysis: Calculated | | |
|---|---|---|---|---|---|---|---|---|
| | | | C | H | N | C | H | N |
| 1 | 58 | 305–310 | | | | | | |
| 2 | 60 | 324–326 | 63.22 | 5.25 | 14.84 | 63.14 | 5.30 | 14.73 |
| 3 | 59 | 265–266 | 63.26 | 5.43 | 14.76 | 63.14 | 5.30 | 14.73 |
| 4 | 83 | 252–6 | 64.92 | 5.80 | 13.82 | 64.69 | 5.93 | 13.72 |
| 5 | 16 | Ca. 235 | 65.83 | 6.20 | 12.95 | 66.03 | 6.46 | 12.84 |
| 6 | 43 | 208–209 | 68.88 | 7.39 | 12.04 | 68.28 | 7.37 | 11.38 |
| 7 | 66 | 197–198 | 70.10 | 8.20 | 10.45 | 70.03 | 8.08 | 10.21 |
| 8 | 55 | 190–191 | 71.83 | 8.84 | 9.54 | 71.48 | 8.67 | 9.27 |

PREPARATION 9.—2-HYDROXY-3-CYCLOALKYL-4H-PYRIDO[1,2-a]PYRIMIDIN-4-ONES

Heating a mixture of 56 grams of diethyl cyclohexylmalonate and 21 grams of 2-aminopyridine at 200–215 degrees centigrade for 9 hours under slight vacuum and diluting the cooled mixture with ether gave 2-hydroxy-3-cyclohexyl-4H-pyrido[1,2-a]pyrimidin-4-one decomposing at 295 degrees.

Calculated for $C_{14}H_{16}N_2O_2$: C, 68.83; H, 6.60; N, 11.47. Found. C, 69.01; H, 6.61; N, 11.71.

PREPARATIONS 10 AND 11.—2-HYDROXY-3-ARYL-4H-PYRIDO[1,2-a]PYRIMIDIN-4-ONES

The 2-hydroxy-3-aryl-4H-pyrido[1,2-a]pyrimidin-4-ones were prepared according to the generalized method of preparations 1 to 8. The experimental details and the results obtained are tabulated below:

*Experimental Details*

| Preparation number | Aryl group | Weight of 2-aminopyridine | Weight of aryl diethyl malonate | Reaction temperature | Reaction time | Volume of alcohol |
|---|---|---|---|---|---|---|
| 10 | Phenyl | 38 | 111 | 190–250 | 2½ | |
| 11 | p-Methoxyphenyl | 45 | 134 | Ca. 200 | | 25 |

*Results*

| Preparation number | Weight of product | Melting point | Analysis: Found | | | Analysis: Calculated | | |
|---|---|---|---|---|---|---|---|---|
| | | | C | H | N | C | H | N |
| 10 | 86 | 308–310 | | | | | | |
| 11 | 110 | Ca. 320 | 67.19 | 4.48 | 10.60 | 67.14 | 4.51 | 10.45 |

PREPARATIONS 12 TO 19.—2-HYDROXY-2-AR-ALKYL-4H-PYRIDO[1,2-a]PYRIMIDIN-4-ONES

The 2-hydroxy-3-aralkyl-4H-pyrido[1,2-a]pyrimidin-4-ones were prepared according to the generalized method of preparations 10 and 11. The experimental details and the results obtained are tabulated below:

*Experimental Details*

| Preparation number | Aralkyl group | Weight of 2-aminopyridine | Weight of aralkyl diethyl malonate | Reaction temperature | Reaction time | Volume of alcohol |
|---|---|---|---|---|---|---|
| 12 | Benzyl | 34 | 104 | 196–260 | 2 | |
| 13 | p-Methylbenzyl | 27 | 79 | 200–220 | 5 | 38 |
| 14 | p-Chlorobenzyl | 32 | 96 | 200–250 | 2 | |
| 15 | p-Methoxybenzyl | 56 | 168 | Ca. 230 | 3½ | 35 |
| 16 | do | *18 | 50 | 180–260 | 2 | |
| 17 | p-Ethoxybenzyl | 23 | 73 | 210–230 | 2½ | 17 |
| 18 | p-Methoxyphenethyl | 17 | 54 | 210–230 | 7 | 11 |
| 19 | o-Methoxybenzyl | 18 | 55 | 220–250 | 3 | |

*Note.—In preparation 16, 5-methyl-2-aminopyridine was the reactant.

*Results*

| Preparation number | Weight of product | Melting point | Analysis: Found | | | Analysis: Calculated | | |
|---|---|---|---|---|---|---|---|---|
| | | | C | H | N | C | H | N |
| 12 | 94 | 320 dec | | | | | | |
| 13 | 62 | 320 dec | 72.06 | 5.32 | 10.68 | 72.17 | 5.30 | 10.52 |
| 14 | 61 | Ca. 320 | 63.04 | 3.95 | 10.01 | 62.82 | 3.87 | 9.77 |
| 15 | 138 | 300 dec | 68.13 | 5.05 | 9.82 | 68.08 | 5.00 | 9.93 |
| 16 | 29 | 312 dec | 69.19 | 5.62 | 9.74 | 68.90 | 5.44 | 9.46 |
| 17 | 33 | Ca. 288 | 68.64 | 5.27 | 9.48 | 68.90 | 5.44 | 9.46 |
| 18 | 34 | 257–258 | 69.04 | 5.49 | 9.53 | 68.90 | 5.44 | 9.46 |
| 19 | 6 | 243 | 67.99 | 5.02 | 9.88 | 68.08 | 5.00 | 9.93 |

EXAMPLES

The 2-alkoxy-4H-pyrido[1,2-a]pyrimidin-4-ones of the present invention are prepared by the following generalized procedure: Heat together a stirred mixture of the 2-hydroxy-4H-pyrido-[1,2-a]pyrimidin-4-one intermediate and an alcoholic solution of an alkali metal alcoholate. Continue stirring and add to the hot reaction mixture over a period of time an aromatic hydrocarbon solution of the reactant aminolower-alkyl halide. When the addition is complete, reflux the reaction mixture and allow the alcohol to boil off. Wash the cooled reaction mixture with an aqueous base such as 5 or 10 percent sodium hydroxide, followed by water, dry the organic layer over a drying agent, and evaporate the hydrocarbon solvent.

The resultant oily 2-alkoxy-4H-pyrido[1,2-a]-pyrimidin-4-ones are converted to their hydrochlorides by dissolving them in an indifferent solvent such as ether or alcohol and adding anhydrous hydrogen chloride most conveniently as its alcoholic solution. The crystalline hydrochloride usually precipitates and can be purified by recrystallization from an alcoholic solvent.

Using the above generalized procedures, the following 2-alkoxy-4H-pyrido[1,2-a]pyrimidin-4-ones were prepared:

EXAMPLE 1.—2-DIETHYLAMINOETHOXY-4H-PYRIDO-[1,2-a]PYRIMIDIN-4-ONE

By the reaction of 30 grams of 2-hydroxy-4H-pyrido[1,2-a]pyrimidin-4-one and 10 grams of sodium methylate in about 100 milliliters of methyl alcohol with about 40 grams of diethylaminoethyl chloride in toluene. The hydrochloride melted 197–198 degrees with decomposition and analyzed—

Calculated for $C_{14}H_{19}N_3O_2 \cdot HCl$: C, 56.47; H, 6.77; N, 14.11. Found: C, 55.82; H, 6.83; N, 13.55.

EXAMPLE 2.—2-(2-DIMETHYLAMINOETHOXY)-3-METHYL-4H-PYRIDO-[1,2-a]PYRIMIDIN-4-ONE

By the reaction of 19 grams of 2-hydroxy-3-methyl-4H-pyrido[1,2-a]pyrimidin-4-one of Preparation 1 and 5.9 grams of sodium methylate in 150 milliliters of ethyl alcohol with about 24 grams of dimethylaminoethyl chloride in 200 milliliters of toluene. The hydrochloride melted at 215 degrees and analyzed—

Calculated for $C_{13}H_{17}N_3O_2 \cdot HCl$: C, 55.01; H, 6.39; N, 14.81. Found: C, 54.91; H, 6.17; N, 15.01.

EXAMPLE 3.—2-(2-DIETHYLAMINOETHOXY)-3-METHYL-4H-PYRIDO-[1,2-a]PYRIMIDIN-4-ONE

By the reaction of 19 grams of 2-hydroxy-3-methyl-4H-pyrido[1,2-a]pyrimidin-4-one of Preparation 1 and 5.9 grams of sodium methylate in 175 milliliters of ethyl alcohol with about 24 grams of diethylaminoethyl chloride in toluene. The hydrochloride melted at 207 degrees and analyzed—

Calculated for $C_{15}H_{21}N_3O_2 \cdot HCl$: C, 57.77; H, 7.11; N, 13.48. Found: C, 57,69; H, 7.20; N, 13.58.

EXAMPLE 4.—2-(2-DIETHYLAMINOETHOXY)-3-ETHYL-4H-PYRIDO-[1,2-a]PYRIMIDIN-4-ONE

By the reaction of 20 grams of 2-hydroxy-3-ethyl-4H-pyrido[1,2-a]pyrimidin-4-one of Preparation 3 and 5.7 grams of sodium methylate in 150 milliliters of ethyl alcohol with about 16 grams of diethylaminoethyl chloride in 175 milliliters of toluene. The hydrochloride melted 160–161 degrees and analyzed—

Caluculated for $C_{16}H_{23}N_3O_2 \cdot HCl$: C, 58.98; H, 7.42; N, 12.90. Found: C, 59.17; H, 7.61; N, 13.06.

EXAMPLE 5.—2-(2-DIMETHYLAMINOETHOXY)-3-ETHYL-4H-PYRIDO-[1,2-a]PYRIMIDIN-4-ONE

By the reaction of 15 grams of 2-hydroxy-3-ethyl-4H-pyrido[1,2-a]pyrimidin-4-one of Preparation 3 and 4.3 grams of sodium methylate in 100 milliliters of ethyl alcohol with about 8.7 grams of dimethylaminoethyl chloride in 75 milliliters of toluene. The hydrochloride melted 176–179 degrees and analyzed—

Calculated for $C_{14}H_{19}N_3O_2 \cdot HCl$: C, 56.47; H, 6.77; N, 14.11. Found: C, 56.29; H, 6.88; N, 13.96.

EXAMPLE 6.—2-(2-DIETHYLAMINOETHOXY)-3-PROPYL-4H-PYRIDO-[1,2-a]PYRIMIDIN-4-ONE

By the reaction of 27 grams of 2-hydroxy-3-propyl-4H-pyrido[1,2-a]pyrimidin-4-one of Preparation 4 and 7.1 grams of sodium methylate in 150 milliliters of ethyl alcohol with about 20 grams of diethylaminoethyl chloride in 220 milliliters of toluene. The hydrochloride melted 139–140 degrees and analyzed—

Calculated for $C_{17}H_{25}N_3O_2 \cdot HCl$: C, 60.07; H, 7.71; N, 12.37. Found: C, 59.90; H, 7.71; N, 12.48.

EXAMPLE 7.—2-(2-DIETHYLAMINOETHOXY)-3-ISOBUTYL-4H-PYRIDO-[1,2-a]PYRIMIDIN-4-ONE

By the reaction of 16 grams of 2-hydroxy-3-isobutyl-4H-pyrido-[1,2-a]pyrimidin-4-one of Preparation 5 and 3.8 grams of sodium methylene in 150 milliliters of ethyl alcohol with about 11 grams of diethylaminoethyl chloride in 250 milliliters of toluene. The hydrochloride melted at 166 degrees and analyzed—

Calculated for $C_{18}H_{27}N_3O_2 \cdot HCl$: C, 61.09; H, 7.97; N, 11.88. Found: C, 61.27; H, 8.01; N, 11.96.

EXAMPLE 8.—2-(2-DIETHYLAMINOETHOXY)-3-HEXYL-4H-PYRIDO-[1,2-a]PYRIMIDIN-4-ONE

By the reaction of 39 grams of 2-hydroxy-3-hexyl-4H-pyrido-[1,2-a]pyrimidin-4-one of Preparation 6 and 8.5 grams of sodium methylate in 200 milliliters of ethyl alcohol with about 41 grams of diethylaminoethyl chloride in toluene. The hydrochloride melted at 128 degrees and analyzed—

Calculated for $C_{20}H_{31}N_3O_2 \cdot HCl$: C, 62.89; H, 8.45; N, 11.00. Found: C, 62.83; H, 8.44; N, 11.22.

EXAMPLE 9.—2-(2-DIETHYLAMINOETHOXY)-3-OCTYL-4H-PYRIDO-[1,2-a]PYRIMIDIN-4-ONE

By the reaction of 25 grams of 2-hydroxy-3-octyl-4H-pyrido [1,2-a] pyrimidin-4-one of Preparation 7 and 4.9 grams of sodium methylate in 100 milliliters of ethyl alcohol with about 13 grams of diethylaminoethyl chloride in 150 milliliters of toluene. The hydrochloride softened at 90 degrees and melted up to 120 even after repeated recrystallization. It analyzed—

Calculated for $C_{22}H_{35}N_3O_2 \cdot HCl$: C, 64.44; H, 8.85; N, 10.25. Found: C, 64.14; H, 8.82; N, 10.46.

EXAMPLE 10.—2-(2-DIETHYLAMINOETHOXY)-3-DECYL-4H-PYRIDO-[1,2-a]PYRIMIDIN-4-ONE

By the reaction of 24 grams of 2-hydroxy-3-decyl-4H-pyrido-[1,2-a]pyrimidin-4-one of Preparation 8 and 4.3 grams of sodium methylate in 100 milliliters of ethyl alcohol with about 11 grams of diethylaminoethyl chloride in 130 milliliters of toluene. After repeated recrystallizations, the hydrochloride softened and melted 85–120 degrees. It analyzed—

Calculated for $C_{24}H_{39}N_3O_2 \cdot HCl$: C, 65.81; H, 9.20; N, 9.59. Found: C, 65.69; H, 9.42; N, 9.76.

EXAMPLE 11.—2-(2-DIETHYLAMINOETHOXY)-3-CYCLOHEXYL-4H-PYRIDO-[1,2-a]PYRIMIDIN-4-ONE

By the reaction of 11 grams of 2-hydroxy-3-cyclohexyl-4H-pyrido-[1,2-a]pyrimidin-4-one of Preparation 9 and 2.5 grams of sodium methylate in 100 milliliters of ethyl alcohol with about 14 grams of diethylaminoethyl chloride in toluene. The hydrochloride melted 188–189 degrees and analyzed—

Calculated for $C_{20}H_{29}N_3O_2 \cdot HCl$: C, 63.23; H, 7.96; N, 11.06. Found: C, 62.99; H, 7.81; N, 10.88.

EXAMPLE 12.—2-(DIETHYLAMINOETHOXY)-3-PHENYL-4H-PYRIDO-[1,2-a]PYRIMIDIN-4-ONE

By the reaction of 25 grams of 2-hydroxy-3-phenyl-4H-pyrido-[1,2-a]pyrimidin-4-one of Preparation 10 and 5.7 grams of sodium methylate in 150 milliliters of ethyl alcohol with about 21 grams of diethylaminoethyl chloride in toluene. The hydrochloride melted 209–210 degrees and analyzed—

Calculated for $C_{20}H_{23}N_3O_2 \cdot HCl$: C, 64.26; H, 6.47; N, 11.24. Found: C, 64.54; H, 6.38; N, 11.27.

EXAMPLE 13.—2-(2-DIETHYLAMINOETHOXY)-3-(p-METHOXYPHENYL)-4H-PYRIDO-[1,2-a]PYRIMIDIN-4-ONE

By the reaction of 41 grams of 2-hydroxy-3-(p-methoxyphenyl)-4H-pyrido-[1,2-a]pyrimidin-4-one of Preparation 11 and 8.4 grams of sodium methylate in 150 milliliters of ethyl alcohol with about 23 grams of diethylaminoethyl chloride in 250 milliliters of toluene. The hydrochloride melted at 217 degrees and analyzed—

Calculated for $C_{21}H_{25}N_3O_3 \cdot HCl$: C, 62.44; H, 6.49; N, 10.40. Found: C, 62.34; H, 6.35; N, 10.68.

EXAMPLE 14.—2-(2-DIETHYLAMINOETHOXY)-3-BENZYL-4H-PYRIDO-[1,2-a]PYRIMIDIN-4-ONE

By the reaction of 27 grams of 2-hydroxy-3-benzyl-4H-pyrido-[1,2-a]pyrimidin-4-one of Preparation 12 and 5.7 grams of sodium methylate in 300 milliliters of ethyl alcohol (did not dissolve) with about 21 grams of diethylaminoethyl chloride in 200 milliliters of toluene. The hydrochloride melted 167–173 degrees with decomposition and analyzed—

Calculated for $C_{21}H_{25}N_3O_2 \cdot HCl$: C, 65.03; H, 6.76; N, 10.83. Found: C, 65.27; H, 6.53; N, 11.03.

EXAMPLE 15.—2-(2-DIMETHYLAMINOETHOXY)-3-BENZYL-4H-PYRIDO-[1,2-a]PYRIMIDIN-4-ONE

By the reaction of 15 grams of 2-hydroxy-3-benzyl-4H-pyrido-[1,2-a]pyrimidin-4-one of Preparation 12 and 3.24 grams of sodium methoxide in 100 milliliters of ethyl alcohol with about 6.6 grams of dimethylaminoethyl chloride in 60 milliliters of toluene. The hydrochloride melted 198–201 degrees and analyzed—

Calculated for $C_{19}H_{21}N_3O_2 \cdot HCl$: C, 63.40; H, 6.16; N, 11.68. Found: C, 63.06; H, 6.30; N, 11.43.

EXAMPLE 16.—2-(2-DIETHYLAMINOETHOXY)-3-(p-METHYLBENZYL)-4H-PYRIDO-[1,2-a]PYRIMIDIN-4-ONE

By the reaction of 20 grams of 2-hydroxy-3-(p-methylbenzyl)-4H-pyrido-[1,2-a]pyrimidin-4-one of Preparation 13 and 4.1 grams of sodium methylate in 150 milliliters of ethyl alcohol with about 10 grams of diethylaminoethyl chloride in 125 milliliters of toluene. The hydrochloride melted 206–208 degrees and analyzed—

Calculated for $C_{22}H_{27}N_3O_2 \cdot HCl$: C, 65.75; H, 7.02; N, 10.46. Found: C, 65.88; H, 7.11; N, 10.76.

EXAMPLE 17.—2-(2-DIETHYLAMINOETHOXY)-3-(p-CHLOROBENZYL)-4H-PYRIDO-[1,2-a]PYRIMIDIN-4-ONE

By the reaction of 20 grams of 2-hydroxy-3-(p-chlorobenzyl)-4H-pyrido-[1,2-a]pyrimidin-4-one of Preparation 14 and 3.8 grams of sodium methylate in 150 milliliters of ethyl alcohol with about 16 grams of diethylaminoethyl chloride in toluene. The hydrochloride melted at 225 degrees with decomposition and analyzed—

Calculated for $C_{21}H_{24}ClN_3O_2 \cdot HCl$: C, 59.73; H, 5.97; N, 9.95. Found: C, 59.47; H, 5.79; N, 10.11.

EXAMPLE 18.—2-(2-DIETHYLAMINOETHOXY)-3-(p-METHOXYBENZYL)-4H-PYRIDO-[1,2-a]PYRIMIDIN-4-ONE

By the reaction of 28 grams of 2-hydroxy-3-(p-methoxybenzyl)-4H-pyrido-[1,2-a]pyrimidin-4-one of Preparation 15 and 5.4 grams of sodium methylate in 150 milliliters of ethyl alcohol with about 20 grams of diethylaminoethyl chloride in 200 milliliters of toluene. The hydrochloride melted 196–107 degrees and analyzed—

Calculated for $C_{22}H_{27}N_3O_3 \cdot HCl$: C, 63.23; H, 6.75; N, 10.06. Found: C, 63.03; H, 6.62; N, 10.26.

EXAMPLE 19.—2-(2-DIMETHYLAMINOETHOXY)-3-(p-METHOXYBENZYL-4H-PYRIDO-[1,2-a]PYRIMIDIN-4-ONE

By the reaction of 20 grams of 2-hydroxy-3-(p-methoxybenzyl)-4H-pyrido-[1,2-a]pyrimidin-4-one of Preparation 15 and 3.8 grams of sodium methylate in 150 milliliters of ethyl alcohol with about 18 grams of dimethylaminoethyl chloride in toluene. The hydrochloride melted 172–173 degrees and analyzed—

Calculated for $C_{20}H_{23}N_3O_3 \cdot HCl$: C, 61.61; H, 6.20; N, 10.78. Found: C, 61.88; H, 6.18; N, 10.98.

EXAMPLE 20.—2-(DIMETHYLAMINOPROPOXY)-3-(p-METHOXYBENZYL)-4H-PYRIDO-[1,2-a]PYRIMIDIN-4-ONE

By the reaction of 30 grams of 2-hydroxy-3-(p-methoxybenzyl)-4H-pyrido-[1,2-a]pyrimidin-4-one of Preparation 15 and 5.8 grams of sodium methylate in 150 milliliters of ethyl alcohol with about 13 grams of dimethylaminopropyl chloride in 180 milliliters of toluene. The hydrochloride melted 182–185 degrees and analyzed—

Calculated for $C_{21}H_{25}N_3O_3 \cdot HCl$: C, 62.44; H, 6.49; N, 10.40. Found: C, 62.31; H, 6.60; N, 10.43.

EXAMPLE 21.—2-(2-PIPERIDINOETHOXY)-3-(p-METHOXYBENZYL)-4H-PYRIDO-[1,2-a]PYRIMIDIN-4-ONE

By the reaction of 20 grams of 2-hydroxy-3-(p-methoxybenzyl)-4H-pyrido-[1,2-a]pyrimidin-4-one of Preparation 15 and 3.8 grams of sodium methylate in 150 milliliters of ethyl alcohol with about 14 grams of N-(2-chloroethylpiperidine) in 200 milliliters of toluene. The repeatedly recrystallized hydrochloride melted about 190–202 degrees and analyzed—

Calculated for $C_{23}H_{27}N_3O_3 \cdot HCl$: C, 64.26; H, 6.56; N, 9.78. Found: C, 63.97; H, 6.74; N, 10.06.

EXAMPLE 22.—2-(2-MORPHOLINOETHOXY)-3-)p-METHOXYBENZYL)-4H-PYRIDO-[1,2-a]PYRIMIDIN-4-ONE

By the reaction of 15 grams of 2-hydroxy-3-(p-methoxybenzyl)-4H-pyrido-[1,2-a]pyrimidin-4-one of Preparation 15 and 2.9 grams of sodium methylate in 100 milliliters of ethyl alcohol with about 8 grams of 2-morpholinoethyl chloride in 150 milliliters of toluene. The hydrochloride melted 161–162 degrees and analyzed—

Calculated for $C_{22}H_{25}N_3O_4 \cdot HCl \cdot H_2O$: C, 58.74; H, 6.27; N, 9.34. Found: C, 58.77; H, 6.49; N, 9.77.

EXAMPLE 23.—2 - (2-DIETHYLAMINOETHOXY) - 3 - (p-METHOXYBENZYL)-4H - 7 - METHYLPYRIDO[1,2-a]PYRIMIDIN-4-ONE

By the reaction of 15 grams of 2-hydroxy-3-(p-methoxybenzyl)-4H-7-methylpyrido[1,2-a]pyrimidin-3-one of Preparation 16 and 2.8 grams of sodium methylate in 150 milliliters of ethyl alcohol with about 8 grams of diethylaminoethyl chloride in 250 milliliters of toluene. The hydrochloride melted 207–208 degrees and analyzed—

Calculated for $C_{23}H_{29}N_3O_3 \cdot HCl$: C, 63.94; H, 7.00; N, 9.73. Found: C, 63.86; H, 7.14; N, 9.69.

EXAMPLE 24.—2 - (2 - DIETHYLAMINOETHOXY - 3 - (p-ETHOXYBENZYL)-4H-PYRIDO-[1,2-A]PYRIMIDIN-4-ONE

By the reaction of 20 grams of 2-hydroxy-3-(p-ethoxybenzyl)-4H-pyrido-[1,2-a]pyrimidin-4-one of Preparation 17 and 3.6 grams of sodium methylate in 150 milliliters of ethyl alcohol with about 18 grams of diethylaminoethyl chloride in toluene. The hydrochloride melted at 222 degrees and analyzed—

Calculated for $C_{23}H_{29}N_3O_3 \cdot HCl$: C, 63.94; H, 7.00; N, 9.73. Found: C, 63.63; H, 6.81; N, 9.92.

EXAMPLE 25.—2 - (2 - DIETHYLAMINOETHOXY) - 3 - (p-METHOXYPHENETHYL) - 4H - PYRIDO-[1,2-a]PYRIMIDIN-4-ONE

By the reaction of 16 grams of 2-hydroxy-3-(p-methoxyphenethyl)-4H-pyrido-[1,2-a]pyrimidin-4-one of Preparation 18 and 2.9 grams of sodium methylate in 100 milliliters of ethyl alcohol with about 14 grams of diethylaminoethyl chloride in 200 milliliters of toluene. The hydrochloride melted 146–147 degrees and analyzed—

Calculated for $C_{23}H_{29}N_3O_3 \cdot HCl$: C, 63.94; H, 7.00; N, 9.73. Found: C, 63.83; H, 7.15; N, 9.83.

EXAMPLE 26.—2 - (2 - DIETHYLAMINOETHOXY) - 3 - (o-METHOXYBENZYL)-4H-PYRIDO-[1,2-a]PYRIMIDIN - 4-ONE

By the reaction of 5.5 grams of 2-hydroxy-3-(o-methoxybenzyl)-4H-pyrido-[1,2-a]pyrimidin-4-one of Preparation 19 and 1.05 grams of sodium methylate in 100 milliliters of ethyl alcohol with about 2.7 grams of diethylaminethyl chloride in 27 millilters of toluene. The hydrochloride melted at 217 degrees and analyzed—

Calculated for $C_{22}H_{27}N_3O_3 \cdot HCl$: C, 63.23; H, 6.75; N, 10.06. Found: C, 62.98; H, 6.73; N, 9.82.

EXAMPLE 27.—2 - (2 - DI-ISOPROPYLAMINOETHOXY)-3-METHYL-4H-PYRIDO-[1,2-a]PYRIMIDIN-4-ONE

By the reaction of 18 grams of 2-hydroxy-3-methyl-4H-pyrido-[1,2-a]pyrimidin-4-one of Preparation 1 and 5.4 grams of sodium methylate in 300 milliliters of ethyl alcohol with 18 grams of di-isopropylaminoethyl chloride in 100 milliliters of toluene. The hydrochloride melted at 205–207 degrees and analyzed—

Calculated for $C_{17}H_{25}N_3O_2 \cdot HCl$: C, 60.09; H, 7.71; N, 12.37. Found: C, 60.21; H, 7.49; N, 12.11.

EXAMPLE 28.—2 - (2 - DIMETHYLAMINOETHOXY)-3-(4-METHOXY-BENZYL)-7-METHYL - 4H - PYRIDO-[1,2-a]-PYRIMIDIN-4-ONE

By the reaction of 20 grams of 2-hydroxy-3-(p-methoxybenzyl) - 7 - methyl - 4H - pyrido - [-1,2 - a]pyrimidin-4-one of Preparation 16 and 3.6 grams of sodium methylate in 150 milliliters of ethyl alcohol with 8.5 grams of dimethylaminoethyl chloride in 70 milliliters of toluene. The hydrochloride melted at 161–165 degrees and analyzed—

Calculated for $C_{21}H_{25}N_3O_3 \cdot HCl$: C, 62.42; H, 6.49; N, 10.41. Found: C, 62.23; H, 6.38; N, 10.46.

EXAMPLE 29.—2-(2-DIETHYLAMINOETHOXY)-3,7-DIMETHYL-4H-PYRIDO-[1,2-a]PYRIMIDIN-4-ONE

By the reaction of 17 grams of 2-hydroxy-3,7-dimethyl-4H-pyrido-[1,2-a]pyrimidin-4-one of Preparation 2 and 4.9 grams of sodium methylate in 300 milliliters of ethyl alcohol with 15 grams of diethylaminoethyl chloride in 100 milliliters of toluene. The hydrochloride melted at 214–215 degrees and analyzed—

Calculated for $C_{16}H_{23}N_3O_2 \cdot HCl$: C, 58.98; H, 7.42; N, 12.89. Found: C, 58.76; H, 7.26; N, 13.06.

The 2-alkoxy-4H-pyrido-[1,2-a]pyrimidin-4-one compounds of this invention exhibited central nervous system stimulant activity as demonstrated by their shortening of the barbiturate-induced hypnosis time when tested in animals. The standard test procedure is summarized as follows: The animals are administered intraperitoneally a standard hypnotic dose of a barbiturate. Five minutes later they are administered subcutaneously the test compound. The duration of sleep is determined for a control group administered only the barbiturate and for the experimental group administered the barbiturate and the test compound. Central nervous system stimulants (analeptics) shorten the sleep time.

Various modifications of this invention will suggest themselves to one skilled in the art and the invention is not to be limited to the above-offered examples. The subject matter which the applicant regards as his invention is particularly pointed out and distinctly claimed as follows:

I claim:

1. A composition of matter in which there is attached to the 4H-pyrido-[1,2-a]-pyrimidin-4-one nucleus, through a lower-alkoxylene bridging radical in turn attached by the oxygen atom thereof to the ring carbon atom in the 2-position of the said nucleus, a secondary amino radical in which the substituents are hydrocarbon radicals having up to ten carbon atoms, which may form part of a monocycle.

2. 2 - amino - lower - alkyleneoxy - 4H - pyrido[1,2-a]-pyrimidin-4-one wherein amino is selected from the group consisting of dilower-alkylamino-, N-piperidino-, N-morpholino-, and N-pyrrolidino.

3. 2 - diethylaminoethoxy - 4H - pyrido - [1,2 - a]-pyrimidin-4-one.

4. 2 - (2 - dimethylaminoethoxy) - 3 - (p - methoxybenzyl)-4H-pyrido-[1,2-a]pyrimidin-4-one.

5. 2 - (2 - diethylaminoethoxy) - 3 - hexyl - 4H-pyrido-[1,2-a]pyrimidin-4-one.

6. 2 - (2 - diethylaminoethoxy) - 3 - (p - methoxybenzyl)-4H-7-methyl-pyrido-[1,2-a]pyrimidin-4-one.

7. 2 - (2 - diethylaminoethoxy) - 3 - cyclohexyl - 4H-pyrido-[1,2-a]pyrimidin-4-one.

8. 2 - (2 - dimethylaminoethoxy) - 3 - (p - methoxybenzyl - 7 - methyl - 4H-pyrido - [1,2-a]pyrimidin - 4-one.

References Cited in the file of this patent

UNITED STATES PATENTS 2,749,345    Hitchings et al. _____ June 5, 1956

OTHER REFERENCES

Burger: Medicinal Chemistry (New York, 1960), pages 37–41 and 63–8.

Chem. Abstracts, vol. 39, pages 5955–66 (1945).

Wagner et al.: Synthetic Organic Chemistry (New York, 1953), pages 226–228.

De Clercq: Rec. trav. Chim., 73, 376–81 (1954).

Noller: Chemistry of Organic Compounds (Philadelphia, 1957), p. 137.

UNITED STATES PATENT OFFICE
CERTIFICATE OF CORRECTION

Patent No. 3,149,112 September 15, 1964

Robert E. Allen

It is hereby certified that error appears in the above numbered patent requiring correction and that the said Letters Patent should read as corrected below.

Column 4, line 21, for "2,5-methyl-2,aminopyridine" read -- 2,5-methyl-2-aminopyridine --; column 5, in the first table, under the heading "Volume of alcohol", opposite 12, insert -- 38 --; same table, under same heading, opposite 13, strike out "38"; column 6, line 59, for "methylene" read -- methylate --; column 7, line 34 for "2-(DIETHYLAMINOETHOXY)-" read -- 2-(2-DIETHYLAMINOETHOXY)- --; column 8, line 12, for "$C_{22}H_{27}N_3O_2HCl$" read -- $C_{22}H_{27}N_3O_2 \cdot HCl$ --; line 33, for "196-107" read -- 196-197 --; column 9, line 9, for "pyrimidin-3-one" read -- pyrimidin-4-one --; line 16, for "-3-" read -- )-3- --; line 17, for "[1,2-A]" read -- [1,2-a] --; same column 9, lines 44 and 45, for "diethylaminethyl" read -- diethylaminoethyl --.

Signed and sealed this 12th day of January 1965.

(SEAL)
Attest:

ERNEST W. SWIDER
Attesting Officer

EDWARD J. BRENNER
Commissioner of Patents